United States Patent
Chen et al.

(10) Patent No.: US 8,270,670 B2
(45) Date of Patent: Sep. 18, 2012

(54) METHOD FOR RECOGNIZING AND TRACING GESTURE

(75) Inventors: Shoei-Lai Chen, Chung Ho (TW); Che-Hao Hsu, Chung Ho (TW)

(73) Assignee: Topseed Technology Corp., Taipei Hsien (TW)

( * ) Notice: Subject to any disclaimer, the term of this patent is extended or adjusted under 35 U.S.C. 154(b) by 936 days.

(21) Appl. No.: 12/344,234

(22) Filed: Dec. 25, 2008

(65) Prior Publication Data

US 2010/0169840 A1   Jul. 1, 2010

(51) Int. Cl.
*G06K 9/00* (2006.01)
(52) U.S. Cl. ........................................ 382/103
(58) Field of Classification Search ............ 382/103, 382/107, 115, 173, 288; 345/156, 158
See application file for complete search history.

(56) References Cited

U.S. PATENT DOCUMENTS

| | | | |
|---|---|---|---|
| 6,002,808 A | 12/1999 | Freeman | |
| 6,215,890 B1* | 4/2001 | Matsuo et al. | 382/103 |
| 6,363,160 B1* | 3/2002 | Bradski et al. | 382/103 |
| 6,819,782 B1* | 11/2004 | Imagawa et al. | 382/115 |
| 7,095,401 B2 | 8/2006 | Liu et al. | |
| 7,200,266 B2* | 4/2007 | Ozer et al. | 382/173 |

FOREIGN PATENT DOCUMENTS

EP    1 950 688 A1    7/2008
JP    P2001-246161 A   9/2001

OTHER PUBLICATIONS

Jongshill Lee et al, "Hand region extraction and gesture recognition from video stream with complex background through entropy analysis", IEEE 2004.
European search report dated Jul. 2, 2009.

* cited by examiner

*Primary Examiner* — Claire X Wang
(74) *Attorney, Agent, or Firm* — Chun-Ming Shih; HDLS IPR Services

(57) ABSTRACT

A method for recognizing and tracing a gesture fetches a gesture image by an image sensor. The gesture image is processed for recognizing and tracing, and a corresponding action is performed according to the processed result. The gesture image is pre-processed and then a moved image is detected. The moved image is analyzed to obtain a gesture feature. When the gesture feature is corresponding to a moved gesture, a center coordinate of the moved gesture is detected and outputted to control a cursor. When the gesture feature is corresponding to a command gesture, a relevant action command is outputted. Therefore, the method provides cursor movement and command input by user gesture.

12 Claims, 5 Drawing Sheets

| 0 | 0 | 0 | 0 | 0 | 1 | 1 | 1 |
|---|---|---|---|---|---|---|---|
| 1 | 1 | 1 | 0 | 0 | 0 | 1 | 1 |
| 0 | 1 | 1 | 1 | 0 | 0 | 0 | 1 |
| 0 | 1 | 1 | 1 | 0 | 0 | 0 | 0 |
| 0 | 1 | 1 | 1 | 0 | 0 | 1 | 0 |
| 0 | 0 | 1 | 1 | 1 | 0 | 1 | 0 |
| 1 | 0 | 0 | 1 | 1 | 1 | 1 | 1 |
| 1 | 1 | 0 | 0 | 1 | 1 | 1 | 1 |

FIG.4A

| 0 | 0 | 0 | 0 | 0 | 1 | 1 | 1 |
|---|---|---|---|---|---|---|---|
| 2 | 2 | 2 | 0 | 0 | 0 | 1 | 1 |
| 0 | 2 | 2 | 2 | 0 | 0 | 0 | 1 |
| 0 | 2 | 2 | 2 | 0 | 0 | 0 | 0 |
| 0 | 2 | 2 | 2 | 0 | 0 | 2 | 0 |
| 0 | 0 | 2 | 2 | 2 | 0 | 2 | 0 |
| 3 | 0 | 0 | 2 | 2 | 2 | 2 | 2 |
| 3 | 3 | 0 | 0 | 2 | 2 | 2 | 2 |

FIG.4B

| 0 | 0 | 0 | 0 | 0 | 0 | 0 | 0 |
|---|---|---|---|---|---|---|---|
| 2 | 2 | 2 | 0 | 0 | 0 | 0 | 0 |
| 0 | 2 | 2 | 2 | 0 | 0 | 0 | 0 |
| 0 | 2 | 2 | 2 | 0 | 0 | 0 | 0 |
| 0 | 2 | 2 | 2 | 0 | 0 | 2 | 0 |
| 0 | 0 | 2 | 2 | 2 | 0 | 2 | 0 |
| 0 | 0 | 0 | 2 | 2 | 2 | 2 | 2 |
| 0 | 0 | 0 | 0 | 2 | 2 | 2 | 2 |

FIG.4C

METHOD FOR RECOGNIZING AND TRACING GESTURE

BACKGROUND OF THE INVENTION

1. Field of the Invention

The present invention relates to a method for recognizing and tracing a gesture, and more particularly to a digital signal processor provided to recognize and trace the gesture.

2. Description of Prior Art

With the development of the computer technology, human computer interface is a crucial research topic. The traditional input apparatuses, such as keyboards, computer mice, and joysticks, are conveniently operated for users. In the last few years, various applications of virtual reality and multimedia system, such as the 3D object operation, the 3D virtual exhibition, the computer graphics, or the action/sport PC games, are usually operated by input apparatuses with high-degree of freedom. However, the above-mentioned traditional keyboards, computer mice, and joysticks are insufficient to provide high effective control for the applications of virtual reality and multimedia system.

Because applications of the human computer interface are widely applied in different fields, a gesture recognition, a voice recognition, or a body language recognition are widely applied in daily life. Moreover, the gesture-based input interface is more natural and direct human computer interface, hence, the gesture recognition application has become a development trend.

In recent years, a glove-based gesture input interface is practically applied to the human computer input interface for gesture recognition and trace. The glove-based gesture input interface is used to provide an accurate and rapid sensing of the gesture recognition and trace. The glove-based gesture indicates that the operator has to wear a special glove where numerous touch sensors are installed. The touch sensors are used to fetch a finger action and a hand motion, and then the fetched signals are transmitted to a computer system. Furthermore, the fetched signals are analyzed to rapidly recognize the finger action and the hand motion. However, the data glove is not only expensive but difficult to fit for hands of various sizes. Besides, the special glove is heavy to limit operation time and operation action for the operator.

Accordingly, a method for recognizing and tracing a gesture is disclosed to reduce developing costs, simplify operation procedure, and increase operation efficiency, variety of the human computer interface.

SUMMARY OF THE INVENTION

Accordingly, a primary object of the present invention is to provide a method for recognizing and tracing a gesture. An image sensor is provided to fetch gesture images and a digital signal processor is provided to process the gesture images. Hence, the gesture images are recognized and traced to perform corresponding action commands to the gesture images. Whereby a DSP-based (digital signal processor, DPS) controller is provided to recognize and trace the gesture.

In order to achieve the objective mentioned above, the prevent invention provides a method for recognizing and tracing a gesture. First, gesture images are pre-processed. Afterward, a largest moved block of the gesture image is detected, and the largest moved block is defined as a gesture block. Afterward, a feature of the gesture block is analyzed and the gesture block is further determined to a moved verification gesture, a command gesture, or an undefined gesture. Finally, a center coordinate of a moved gesture is detected, traced, and outputted when the gesture block is the moved verification gesture and the moved verification gesture continuously changes to the moved gesture, and the moved gesture doesn't stop moving with duration over an action time.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 4A, FIG. 4B, and FIG. 4C are schematic views of labeling the gesture blocks;

DETAILED DESCRIPTION OF THE INVENTION

Figure 1:
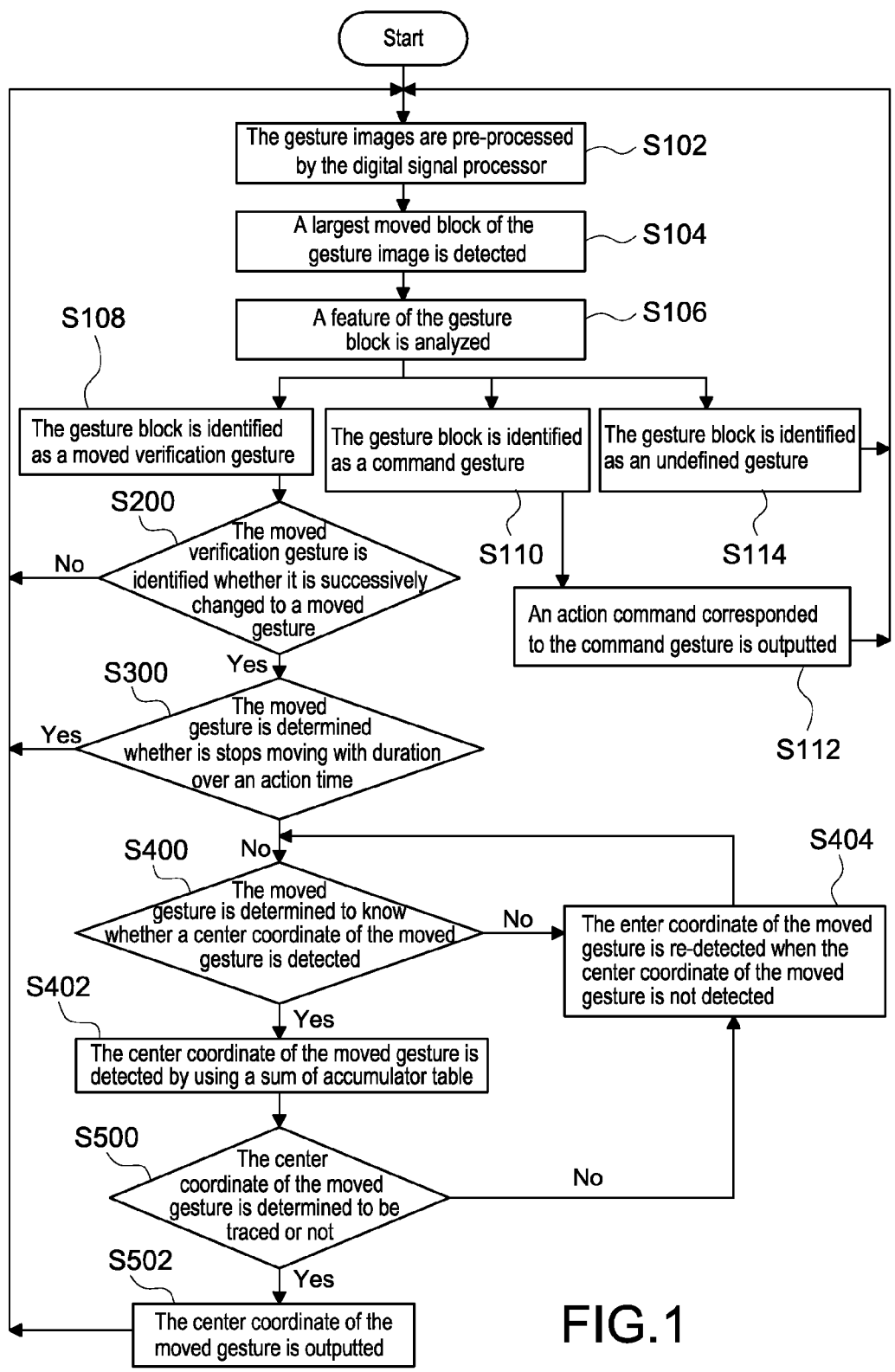
FIG. 1 is a flowchart of a method for recognizing and tracing a gesture according to the present invention.

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Reference will now be made to the drawing figures to describe the present invention in detail.

Reference is made to FIG. 1 which is a flowchart of a method for recognizing and tracing a gesture according to the present invention. The method fetches gesture images by an image sensor and then the gesture image is processed by a digital signal processor. The details are as follows:

First, the gesture images are pre-processed by the digital signal processor (S102). Because an image contains more noises before pre-processing, it tends to increase false recognizing rates. Further, useless information of the image could reduce overall execution efficiency. Hence, the fetched image will be pre-processed before analyzing. The pre-processed step (S102) contains: first, processed size of the gesture images are adjusted and then colors of the gesture images are transferred from the full-color gesture images to the gray-level gesture images. Afterward, speckle noises of the gesture images are filtered by an image low pass filter. Accordingly, the gesture images are pre-processed to increase accuracy and to increase transmission speed.

Afterward, a largest moved block of the gesture image is detected and the largest moved block is defined as a gesture block (S104). The motion detection step (S104) contains: first, an analysis of a dynamic image difference is utilized to produce binary gesture images by transferring the gesture images, and the binary gesture images are calculated to detect moved portions of the gesture block. Afterward, horizontal projections and vertical projections of the gesture block are gathered statistically to calculate a largest moved area. Afterward, a dilation method is utilized to fill empty holes of the gesture block. Finally, a largest connected area of the gesture block is calculated to detect the largest moved block.

Figure 2:
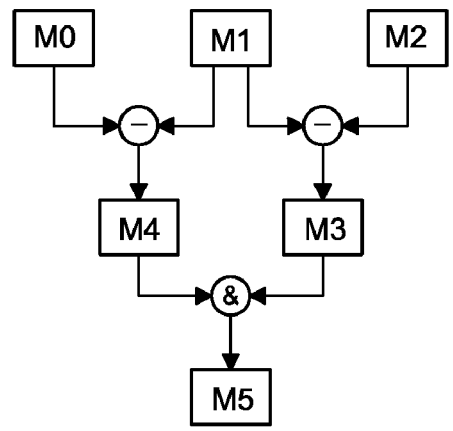
FIG. 2 is a schematic view of utilizing a dynamic image difference.

Reference is made to FIG. 2 which is a schematic view of utilizing a dynamic image difference. Three continuous gesture images are calculated to detect a real moved object. The three continuous gesture images are a current grey-level image M2, a preceding grey-level image M1 before the current grey-level image M2, and a pre-preceding grey-level image M0 before the preceding grey-level image M1, respectively. A threshold value is set for converting the grey-level image into a binary image. The current grey-level image M2 is subtracted by the preceding grey-level image M1 to obtain a new grey-level image. Afterward, a grey value of each pixel of the new grey-level image is compared to the threshold value. A pixel is set as a dark pixel when the grey value of the pixel is greater than or equal to the threshold value; on the contrary, a pixel is set as a bright pixel when the grey value of the pixel is less than the threshold value. Hence, a new binary image M3 is composed of the bright pixels and the dark pixels. In the same way, the preceding grey-level image M1 is subtracted by the pre-preceding grey-level image M0 to obtain another new grey-level image. Afterward, a grey value of each pixel of the another new grey-level image is compared to the threshold value to obtain another new binary image M4. Finally, a logic AND operation is performed between the binary image M3 and the binary image M4 to produce a binary image M5, that the binary image M5 is the moved portions of the gesture image.

Figure 3:
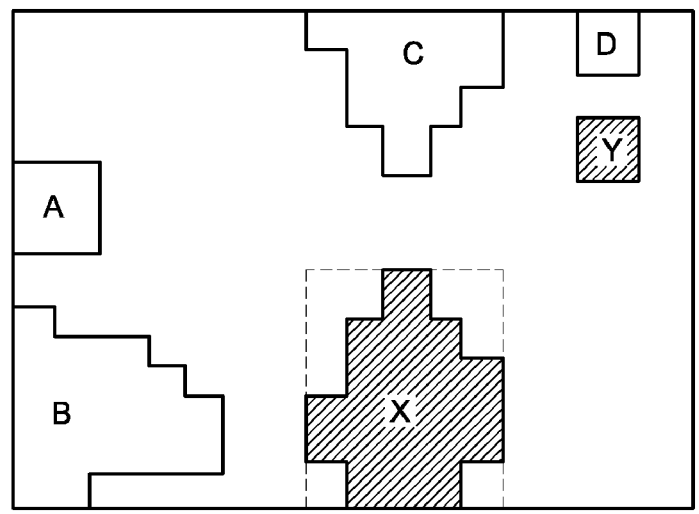
FIG. 3 is a schematic view of calculating horizontal projections and vertical projections.

Reference is made to FIG. 3 which is a schematic view of calculating horizontal projections and vertical projections. The horizontal projections and the vertical projections of the binary image M5 are gathered statistically to find a largest moved area. As shown in FIG. 3, there are two larger moved blocks labeled X and Y, respectively. The moved blocks X, Y are calculated to obtain two larger horizontal projections A, B, and two larger vertical projections C, D, respectively. Afterward, a logic "AND" operation is performed between the largest horizontal projection B and the largest vertical projection C to obtain an intersected area X that equals to the largest moved block X.

References are made to FIG. 4A to FIG. 4C which are schematic views of labeling the gesture blocks. The intersected area X contains empty holes, and the empty holes are filled by using a dilation method. The binary 1's and binary 0's represent the bright pixels and the dark pixels of the binary image, respectively (as shown in FIG. 4A). Afterward, the connected areas are labeled to re-assign numbers (as shown in FIG. 4B), and then the largest connected area is retained (as shown in FIG. 4C) after calculating and comparing areas of the connected areas.

Afterward, a feature of the gesture block is analyzed to determine the gesture block is a moved verification gesture, a command gesture, or an undefined gesture (S106). That is, relative peak and valley values are compared with gesture image data to analyze the feature of the gesture block, and the analyzed results are stored in a buffer memory. For example, when the operator opens his/her palm and shows fingers, each fingertip of the fingers has the relative peak value; and each interdigital portion between two fingers or each side of the palm has the relative valley value. Hence, the gesture block has five relative peak values and six relative valley values.

Reference is made to FIG. 1 again. After the gesture block is identified as the moved verification gesture (S108), the moved verification gesture is identified whether it is successively changed to a moved gesture (S200). The step (S102) is re-performed when the moved verification gesture is not successively changed to the moved gesture. A cursor is controlled to move when the gesture is successively changed to the moved gesture. The moved verification gesture is defined as a V-shaped gesture formed by an index finger and a middle finger. When an operator shows his/her index finger and middle finger to form a V-shaped gesture, the V-shaped gesture is detected and compared with the gesture image data to confirm that the V-shaped gesture is the moved verification gesture. A cursor is controlled to move, when the moved gesture is detected in a moving status. Afterward, the moved gesture is determined whether it stops moving with duration over an action time (S300). The step (S102) is re-performed when the moved gesture stops moving with duration over the action time. The action time can be set according to different use manners or use demands of operators. For example, the action time is set to one second in this embodiment. Afterward, the moved gesture is determined to know whether a center coordinate of the moved gesture is detected (S400) when the moved gesture does not stop moving over the action time. The center coordinate of the moved gesture is detected by using the sum of accumulator table (SAT) (S402). The center coordinate of the moved gesture is re-detected (S404) when the center coordinate of the moved gesture is not detected, and then the step (S400) is re-performed. The moved gesture is defined as a circle-shaped gesture formed by clenching a fist of user. Afterward, the circular Hough transfer is employed to gather statistics of the center coordinate of the moved gesture to trace the center coordinate of the moved gesture.

The center coordinate of the moved gesture is determined to be traced or not (S500) when the center coordinate of the moved gesture is detected. The step (S404) is re-performed when the center coordinate of the moved gesture is not traced. Afterward, the center coordinate of the moved gesture is outputted (S502) when the center coordinated is traced, and then the step (S102) is re-performed.

Figure 5A:
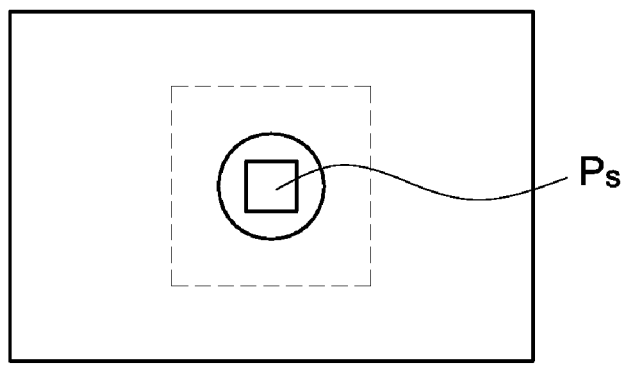
FIG. 5A and FIG. 5B are schematic views of tracing a center coordinate of a moved gesture.
Figure 5B:
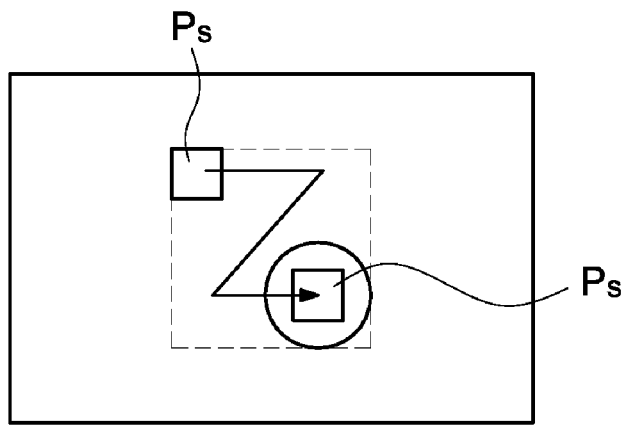

References are made to FIG. 5A and FIG. 5B which are schematic views of tracing a center coordinate of a moved gesture. A template Ps is a square area with 40*40 pixels size and produced when the center coordinate of the moved gesture is detected, and the center coordinate of the moved gesture is a center of the template Ps. Each gray-level value of the pixels in the template Ps is summed and the sum of accumulator table (SAT) is used to trace the center coordinate of the moved gesture. A search area is a square area with 120*120 pixels size, and a difference of summed gray-level values between the template Ps and the corresponding area of the search area is calculated and compared to find a new center coordinate of the moved gesture. That is, the new center coordinate of the moved gesture is found when the summed gray-level value of the template Ps is larger than the summed gray-level value of the area corresponded to the template Ps. Hence, the template Ps is provided to trace the new center coordinate of the moved gesture from top-left corner to the bottom-right right of the search area, and the new center coordinate are stored in the buffer memory. Finally, the step (S102) is re-performed when the moved gesture stops moving over the action time.

In addition, an action command corresponded to the command gesture is outputted (S112) when the gesture block is the command gesture (S110), and then the step (S102) is re-performed. When the operator shows his/her index finger to form a "l"-shaped gesture, the "l"-shaped gesture is detected and compared with the gesture image data to confirm that the "l"-shaped gesture is the command gesture. It is to assume that the "l"-shaped gesture is corresponded to a "click" action. Hence, a click action is performed when the command gesture is detected. The command gesture can be set to other gestures to perform other different action commands.

Furthermore, the step (S102) is re-performed when the gesture block is detected to the undefined gesture (S114). That is, the step (S102) is re-performed when the gesture block is not the V-shaped moved verification gesture, the circle-shaped moved gesture, or the "l"-shaped command gesture.

Figure 6:
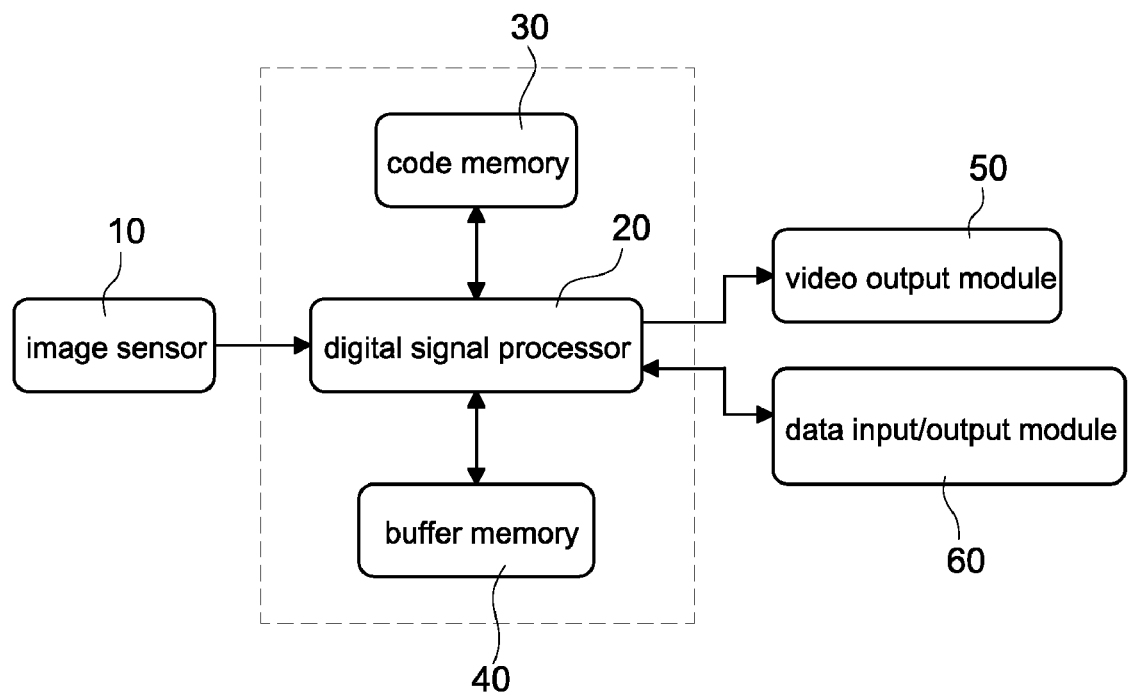
FIG. 6 is a block diagram of an apparatus for recognizing and tracing the gesture.

Reference is made to FIG. 6 which is a block diagram of an apparatus for recognizing and tracing a gesture. The apparatus has an image sensor 10, a digital signal processor 20, a code memory 30, a buffer memory 40, and a video output module 50. The image sensor 10 is provided to fetch a gesture image. The digital signal processor 20 is electrically connected to the image sensor 10 and provides an algorithm to process the gesture image. The code memory 30 is electrically connected to the digital signal processor 20 to store either the algorithm or a great quantity of processed data. The code memory 30 can be a flash memory. The buffer memory 40 is electrically connected to the digital signal processor 20 to provide a demanded buffer for the digital signal processor 20. The buffer memory 40 can be a random access memory (RAM). The video output module 50 is electrically connected to the digital signal processor 20 to output a processed image result from the digital signal processor 20. The processed image result can be outputted to an analog display apparatus (not shown), such as a television or a monitor; or can be outputted to a digital display apparatus (not shown), such as a liquid crystal display. The digital signal processor 20 is further electrically connected to a data input/output module 60 to not only output the processed image result to other apparatuses (not shown) via different output interfaces but also receive external control commands to control operation of the digital signal processor 20.

In conclusion, the present invention has the following advantages:

1. The DSP-based controller is provided to recognize and trace gesture to significantly reduce development costs and simplify operation procedures without any special gloves, icon patterns, or lighting apparatuses.

2. The DSP-based controller is further connected to external individual apparatuses to promote portability and expansibility of the system.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for recognizing and tracing a gesture to provide an image sensor (10) to fetch a gesture image, the method comprising the steps of: (a) pre-processing the gesture image; (b) detecting a largest moved block of the gesture image and defining the largest moved block as a gesture block, (b1) calculating moved portions of the gesture image by utilizing an analysis of dynamic image difference; (b2) calculating a largest moved area of the gesture image by gathering statistically horizontal projections and vertical projections of the gesture image; (b3) filling empty holes of the gesture block by utilizing a dilation method; and (b4) calculating a largest connected area to detect the largest moved block by labeling connected areas; (c) analyzing a feature of the gesture block to determine the gesture block is a moved verification gesture or a command gesture; (d) determining whether the gesture block is successively changed to a moved gesture when the gesture block is the moved verification gesture; (e) detecting and tracing a center coordinate of the moved gesture when the gesture block successively changes to the moved gesture, and the moved gesture does not stop moving with duration over an action time; and (f) outputting the center coordinate of the moved gesture and re-performing the step (a).

2. The method in claim 1, wherein the step (a) comprising:
   (a1) adjusting processed size of the gesture image;
   (a2) transferring colors of the gesture image; and
   (a3) filtering speckle noises of the gesture image.

3. The method in claim 1, wherein the step (e) comprising:
   (e1) detecting the center coordinate of the moved gesture by utilizing the circular Hough transfer; and
   (e2) tracing the center coordinate of the moved gesture by utilizing the sum of accumulator table.

4. The method in claim 1, the step (d) further comprising:
   re-performing the step (a) when the gesture block is the moved verification gesture and the gesture block is successively changed to be not a moved gesture.

5. The method in claim 1, the step (d) further comprising:
   outputting an action command corresponded to the command gesture and then re-performing the step (a) when the gesture block is the command gesture.

6. The method in claim 1, the step (d) further comprising:
   re-performing the step (a) when the gesture block is an undefined gesture.

7. The method in claim 1, the step (e) further comprising:
   re-performing the step (a) when the moved gesture stops moving with duration over the action time.

8. The method in claim 1, the step (e) further comprising:
   re-detecting the center coordinate of the moved gesture when the center coordinate of the moved gesture is not detected or traced.

9. The method in claim 1, wherein the action time is set to be one second.

10. The method in claim 1, wherein the moved verification gesture is defined as a V-shaped gesture formed by an index finger and a middle finger.

11. The method in claim 1, wherein the moved gesture is defined as a circle-shaped gesture formed by clenching a fist.

12. The method in claim 1, wherein the command gesture is defined as a "l"-shaped gesture formed by the index finger.

* * * * *